United States Patent
Martin et al.

(10) Patent No.: US 11,728,583 B2
(45) Date of Patent: *Aug. 15, 2023

(54) MECHANICAL GROUNDING CLAMP

(71) Applicant: HUBBELL INCORPORATED, Shelton, CT (US)

(72) Inventors: Evan Martin, Merrimack, NH (US); Logan Michael Trombley, Manchester, NH (US); Sam Carbonneau, Goffstown, NH (US); Reid Ruland, Hooksett, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/512,113

(22) Filed: Oct. 27, 2021

(65) Prior Publication Data

US 2022/0052465 A1     Feb. 17, 2022

Related U.S. Application Data

(60) Continuation of application No. 17/032,796, filed on Sep. 25, 2020, now Pat. No. 11,165,175, which is a
(Continued)

(51) Int. Cl.
   *H01R 4/64*        (2006.01)
   *F16B 2/06*        (2006.01)
   (Continued)

(52) U.S. Cl.
   CPC .............. *H01R 4/64* (2013.01); *F16B 2/065* (2013.01); *H01R 4/34* (2013.01); *F16B 2/02* (2013.01);
(Continued)

(58) Field of Classification Search
   CPC ... H01R 4/64; H01R 4/34; H01R 4/28; H01R 4/30; H01R 4/36; H01R 4/38; H01R 4/46;
(Continued)

(56) References Cited

U.S. PATENT DOCUMENTS 4,828,504 A     5/1989   Franks, Jr.
5,616,036 A     4/1997   Polidori
(Continued)

FOREIGN PATENT DOCUMENTS

EP     2108848 A1    10/2009
GB     2367960 A   *   4/2002   .............. H01R 4/36
GB     2367960 A      4/2002

OTHER PUBLICATIONS

International Search Report and Written Opinion Issued in International Application No. PCT/US2018/059211, dated Mar. 1, 2019, 13 pages.
(Continued)

*Primary Examiner* — Abdullah A Riyami
*Assistant Examiner* — Justin M Kratt
(74) *Attorney, Agent, or Firm* — Dilworth IP, LLC

(57) ABSTRACT

A mechanical grounding clamp including a body, having an upper plate defining a threaded hole therethrough and having an outer surface, a lower plate spaced apart from the upper plate and having an inner surface, and a connecting plate connecting the upper plate to the lower plate, a fastener mateable with the threaded hole in the upper plate and having a proximal end and a distal end, the distal end extendable through the threaded hole of the upper plate and toward the inner surface of the lower plate. There may be a nut on the fastener for driving toward the upper plate to secure a grounding conductor to the body.

17 Claims, 9 Drawing Sheets

Related U.S. Application Data division of application No. 16/180,225, filed on Nov. 5, 2018, now Pat. No. 10,811,792.

(60) Provisional application No. 62/584,187, filed on Nov. 10, 2017.

(51) Int. Cl.
| | |
|---|---|
| *H01R 4/34* | (2006.01) |
| *H01R 9/24* | (2006.01) |
| *H01R 4/36* | (2006.01) |
| *H01R 13/648* | (2006.01) |
| *H01R 4/38* | (2006.01) |
| *H01R 13/6596* | (2011.01) |
| *H01R 4/66* | (2006.01) |
| *H01R 4/30* | (2006.01) |
| *H01R 4/46* | (2006.01) |
| *F16B 2/02* | (2006.01) |
| *H01R 4/28* | (2006.01) |
| *H01R 11/26* | (2006.01) |

(52) U.S. Cl.
CPC ............... *F16B 2/06* (2013.01); *H01R 4/28* (2013.01); *H01R 4/30* (2013.01); *H01R 4/36* (2013.01); *H01R 4/38* (2013.01); *H01R 4/46* (2013.01); *H01R 4/643* (2013.01); *H01R 4/66* (2013.01); *H01R 9/2483* (2013.01); *H01R 11/26* (2013.01); *H01R 13/648* (2013.01); *H01R 13/6596* (2013.01)

(58) Field of Classification Search
CPC ........ H01R 4/643; H01R 4/66; H01R 9/2483; H01R 11/26; H01R 13/648; H01R 13/6596; F16B 2/065; F16B 2/02; F16B 2/06
See application file for complete search history.

(56) References Cited

U.S. PATENT DOCUMENTS

| | | | |
|---|---|---|---|
| 6,011,218 A | | 1/2000 | Burek |
| 7,988,464 B2 * | | 8/2011 | Kossak ............... F16B 2/065 |
| | | | 439/803 |
| 2004/0033730 A1 | | 2/2004 | Oda |
| 2004/0092142 A1 | | 5/2004 | Clark |
| 2004/0154818 A1 | | 8/2004 | Franks |
| 2014/0329420 A1 | | 11/2014 | Magno |
| 2017/0117640 A1 | | 4/2017 | Arenburg |

OTHER PUBLICATIONS

Notice of Allowance dated Jul. 6, 2021 for U.S. Appl. No. 17/032,796 (pp. 1-9).

* cited by examiner

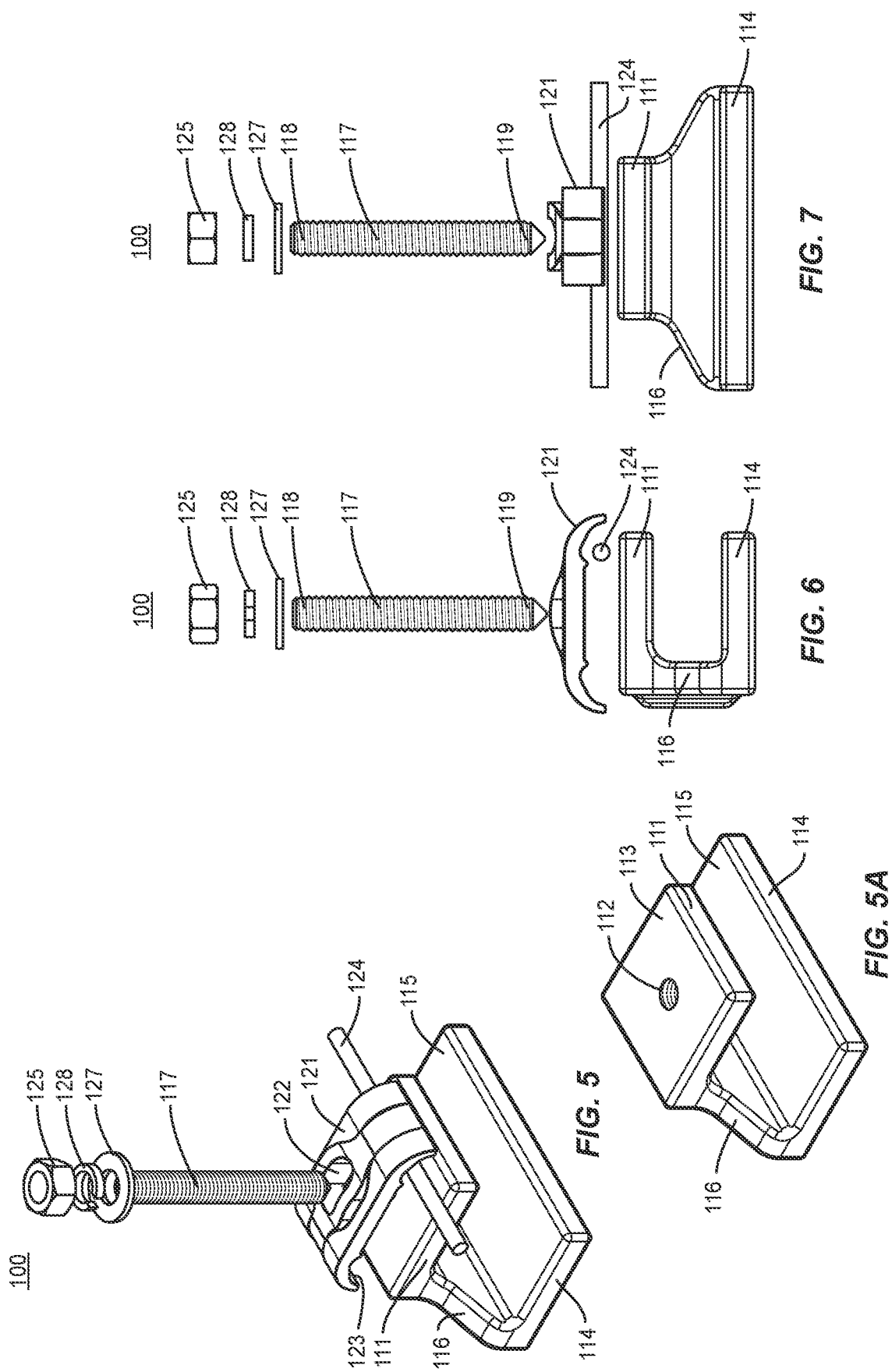

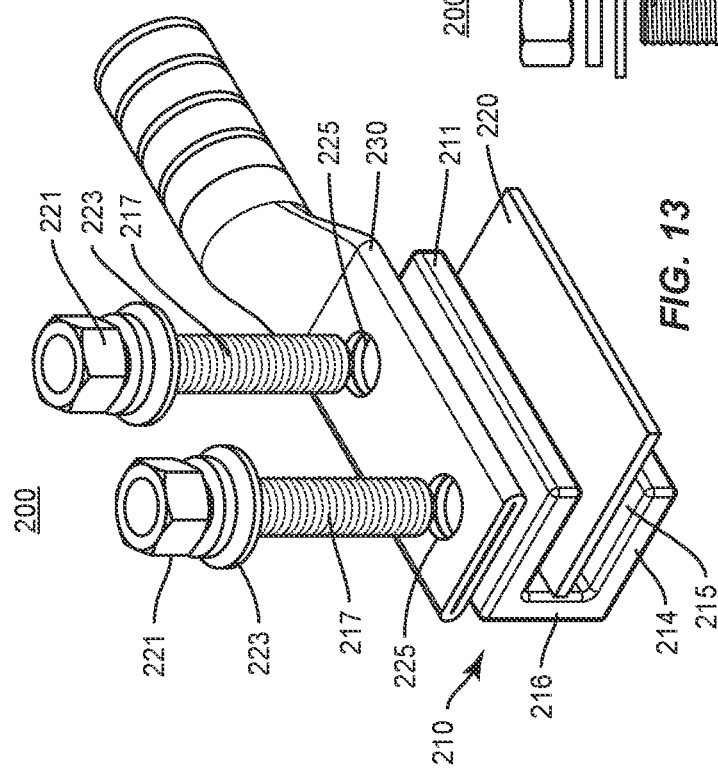
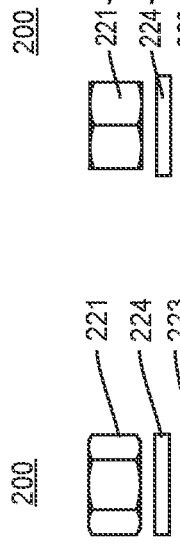
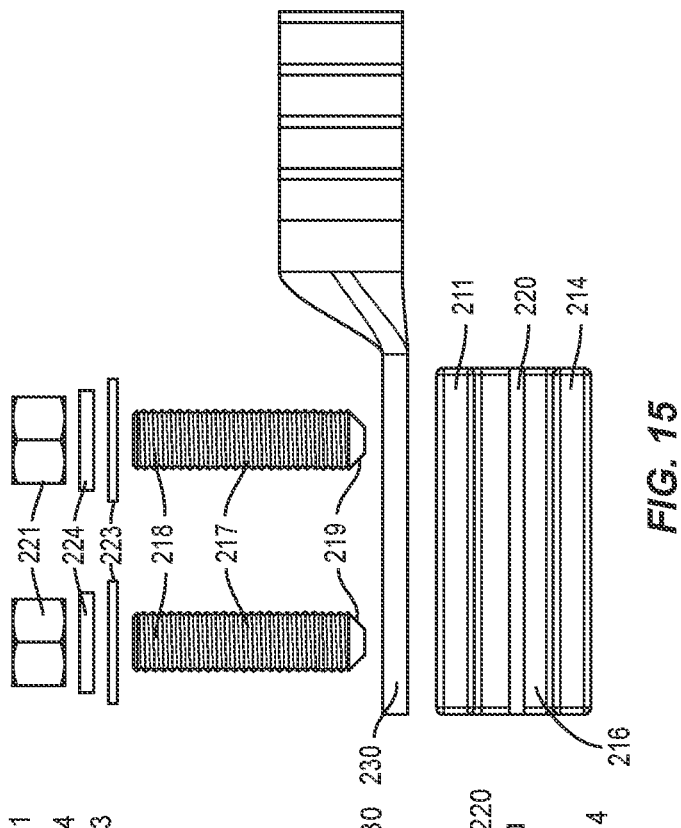
FIG. 13
FIG. 13A
FIG. 14
FIG. 15

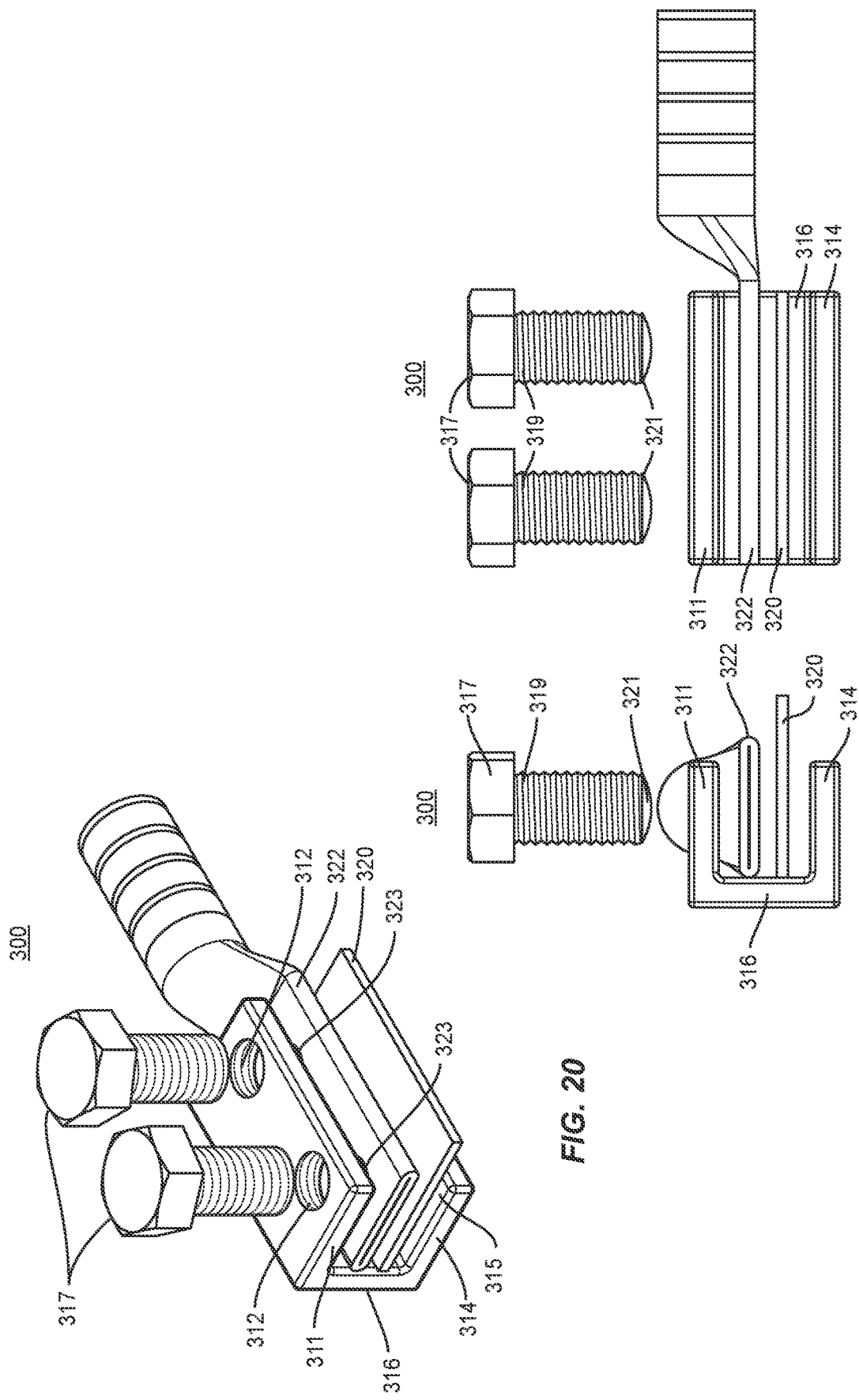

MECHANICAL GROUNDING CLAMP

CROSS-REFERENCE TO RELATED APPLICATIONS

This application is a continuation of U.S. patent application Ser. No. 17/032,796 filed on Sep. 25, 2020, which is a divisional of U.S. patent application Ser. No. 16/180,225 filed on Nov. 5, 2018, now U.S. Pat. No. 10,811,792, which claims the benefit of U.S. provisional application No. 62/584,187 filed on Nov. 10, 2017, the contents of which are incorporated herein by reference in their entirety.

BACKGROUND

The present disclosure relates to grounding components, and more particularly, to mechanical grounding clamps.

Mechanical grounding clamps connect an electrical grounding wire to a grounded structural member. Examples of a grounded structural member can include a steel beam or a steel plate to which the grounding wire is connected.

An electrical connection between the grounding wire and the structural member is accomplished by securing the grounding wire to the structural member via the clamp. The grounding wire is secured to the structural member using a mounting component, to secure the clamp to the structural member, and a contacting component, to secure the grounding wire to the clamp.

Currently available mechanical grounding clamps accomplish the aforementioned securing using fasteners, usually in the form of threaded bolts, set screws, mounting pins, or a combination thereof. Typically, multiple fasteners are required for each of the mounting component and the contacting component.

To establish an adequate mechanical and electrical connection, all of the fasteners need to be tightened, adding time and complexity to the installation process.

Therefore, there is a need for a clamp that is capable of establishing a strong mechanical and electrical connection with a structural member with a least number of fasteners. Additionally, there is a need for a clamp that is capable of being installed quickly and easily.

The present invention solves these and other problems in the prior art.

SUMMARY

A mechanical grounding clamp includes a body, a set screw, and a nut.

According to a first illustrative embodiment, a mechanical grounding clamp includes a body, having an upper plate and a lower plate, the upper plate defining a threaded hole therethrough and having an outer surface, and the lower plate being spaced apart from the upper plate and having an inner surface, and the body further having a connecting plate connecting the upper plate to the lower plate. There is a set screw mateable with the threaded hole in the upper plate and having a proximate end and a distal end, the distal end extendable through the threaded hole of the upper plate and toward the inner surface of the lower plate and configured to secure the body to a grounded member positionable between the distal end of the set screw and the inner surface of the lower plate. There is also a cap defining a set screw hole therethrough, the set screw hole being sized to permit the set screw to pass freely therethrough, the cap having an inner surface and being affixable to the outer surface of the upper plate and configured to secure a grounding wire between the inner surface of the cap and the outer surface of the upper plate with the set screw extending through the set screw hole; and a threaded nut mateable with the set screw configured to secure the cap to the upper plate. Optionally, the proximate end of the set screw includes a hex head and wherein the threaded nut is sized so that when threaded on the set screw it can be driven by a socket driver without interference from the hex head.

According to a second illustrative embodiment, a mechanical grounding clamp includes a body, having an upper plate and a lower plate, the upper plate defining at least one threaded hole therethrough and having an outer surface, the lower plate being spaced apart from the upper plate and having an inner surface, and the body further having a connecting plate connecting the upper plate to the lower plate. There is at least one set screw mateable with a threaded hole in the upper plate and having a proximate end and a distal end, the distal end extendable through the threaded hole of the upper plate and toward the inner surface of the lower plate and configured to secure the body to a grounded member positionable between the distal end of the set screw and the inner surface of the lower plate, and a threaded nut on the set screw above the upper plate.

According to a third illustrative embodiment, a mechanical grounding clamp includes a body, having an upper plate and a lower plate, the upper plate defining at least one threaded hole therethrough, and the lower plate being spaced apart from the upper plate and having an inner surface, and the body further having a connecting plate connecting the upper plate to the lower plate. There is at least one threaded bolt mateable with a threaded hole in the upper plate and having a proximate end and a distal end, the distal end being extendable through the threaded hole of the upper plate and toward the inner surface of the lower plate and being configured to secure the body to a lug attached to a grounding wire and a grounded member positionable between the distal end of the bolt and the inner surface of the lower plate.

According to a fourth illustrative embodiment, there is provided a method for grounding a structure, comprising attaching a grounding conductor to the structure; providing a grounding clamp comprising a body having an upper plate and a lower plate, the upper plate defining at least one threaded hole therethrough and having an outer surface, a the lower plate being spaced apart from the upper plate and having an inner surface, and the body further having a connecting plate connecting the upper plate to the lower plate, and a set screw mateable with the threaded hole in the upper plate and having a proximate end and a distal end, the distal end extendable through the threaded hole of the upper plate and toward the inner surface of the lower plate; positioning a grounded member and the grounding conductor between the upper plate and the lower plate; driving the set screw through the threaded hole toward the grounded member to secure the body to the grounded member and the grounding conductor; and driving a nut on the set screw to secure the grounding conductor to the body.

According to fifth illustrative embodiment, a method for grounding a structure comprises attaching a grounding conductor to the structure; providing a grounding clamp comprising a body having an upper plate and a lower plate, the upper plate defining at least one threaded hole therethrough and having an outer surface, a the lower plate being spaced apart from the upper plate and having an inner surface, and the body further having a connecting plate connecting the upper plate to the lower plate, and a set screw mateable with the threaded hole in the upper plate and having a proximate end and a distal end, the distal end extendable through the threaded hole of the upper plate and toward the inner surface of the lower plate; positioning a grounded member between the upper plate and the lower plate; and driving the set screw through the threaded hole toward the grounded member to secure the body to the grounded member.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 5 is an exploded perspective view of a representative mechanical grounding clamp according to a first illustrative embodiment of the present disclosure;

FIG. 5A is a perspective view of the body of a representative mechanical grounding clamp according to a first illustrative embodiment of the present disclosure;

FIG. 6 is an exploded side elevation view of the body of a representative mechanical grounding clamp according to a first illustrative embodiment of the present disclosure;

FIG. 7 is an exploded front elevation view of the body of a representative mechanical grounding clamp according to a first illustrative embodiment of the present disclosure;

FIG. 13 is an exploded perspective view of a representative mechanical grounding clamp according to a second illustrative embodiment of the present disclosure with a lug and grounded member positioned for securing thereto;

FIG. 13A is a perspective view of the body and grounded member of FIG. 12;

FIG. 14 is an exploded side elevation view of the body of a representative mechanical grounding clamp according to a second illustrative embodiment of the present disclosure;

FIG. 15 is an exploded front elevation view of the body of a representative mechanical grounding clamp according to a second illustrative embodiment of the present disclosure;

FIG. 20 is an exploded perspective view of a representative mechanical grounding clamp according to a third illustrative embodiment of the present disclosure with a lug and grounded member positioned for securing thereto;

FIG. 21 is an exploded side elevation view of the body of a representative mechanical grounding clamp according to a third illustrative embodiment of the present disclosure with a lug and grounded member positioned for securing thereto; and FIG. 22 is an exploded front elevation view of the body of a representative mechanical grounding clamp according to a third illustrative embodiment of the present disclosure with a lug and grounded member positioned for securing thereto.

DETAILED DESCRIPTION

Figure 1:
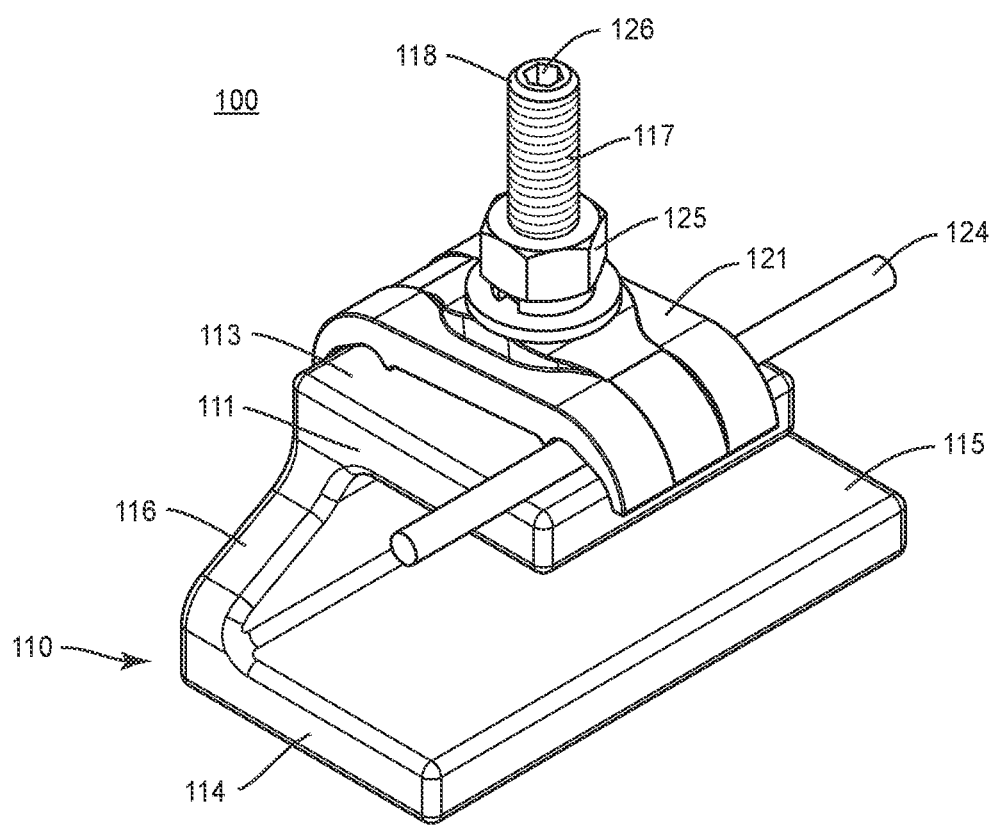
FIG. 1 is a perspective view of a representative mechanical grounding clamp according to a first illustrative embodiment of the present disclosure, with a grounding wire therein.
Figure 4:
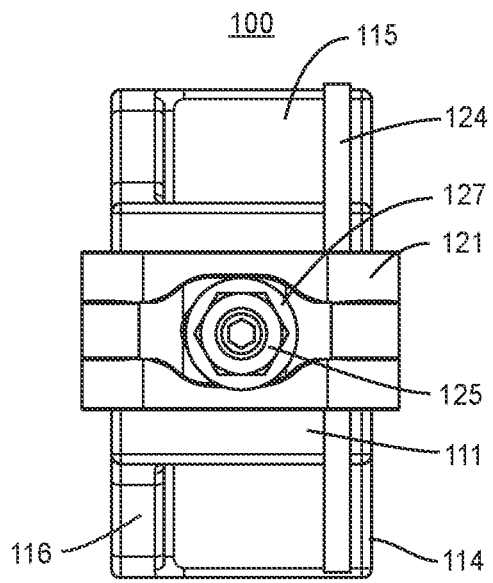
FIG. 4 is a top plan view of the representative mechanical grounding clamp according to a first illustrative embodiment of the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

A mechanical grounding clamp is disclosed herein. Reference will now be made in detail to the illustrative embodiments of the present disclosure, which are illustrated in the accompanying figures.

First Embodiment

In a first embodiment, illustrated in FIGS. 1-8, a mechanical grounding clamp 100 includes a body 110, having an upper plate 111 defining a threaded hole 112 (FIG. 5A) therethrough and having an outer surface 113. The body 110 includes a lower plate 114 spaced apart from the upper plate 111 and having an inner surface 115, and a connecting plate 116 connecting the upper plate 111 to the lower plate 114. A cross-section of the body 110 is generally C-shaped.

Figure 2:
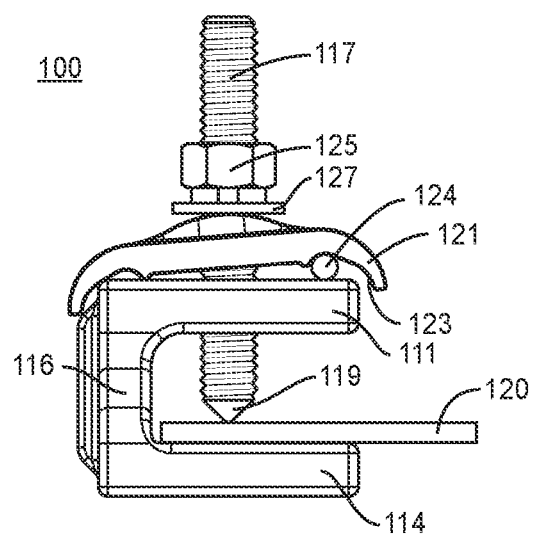
FIG. 2 is a side elevation view of the representative mechanical grounding clamp according to a first illustrative embodiment of the present disclosure.
Figure 3:
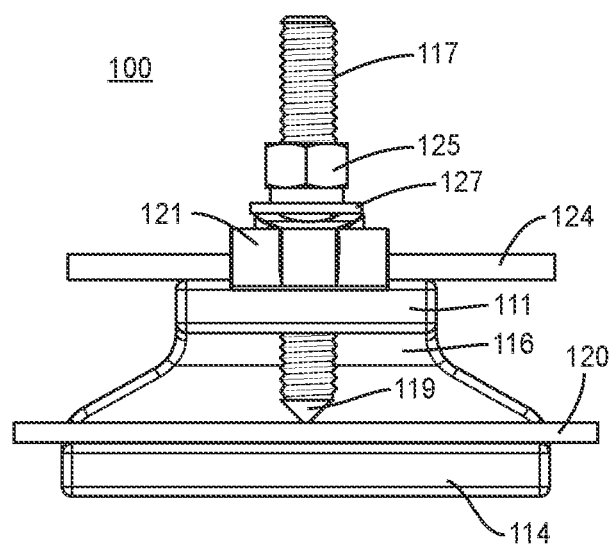
FIG. 3 is a front elevation view of the representative mechanical grounding clamp according to a first illustrative embodiment of the present disclosure.

The mechanical grounding clamp 100 also includes a set screw 117 mateable with the threaded hole 112 in the upper plate 111 and having a proximate end 118 and a distal end 119 (FIG. 2). The distal end 119 is extendable through the threaded hole 112 of the upper plate 111 and toward the inner surface 115 of the lower plate 114. The set screw 117 is configured to secure the body 110 to a grounded member 120 (FIG. 2) positionable between the distal end 119 of the set screw 117 and the inner surface 115 of the lower plate 114.

The proximate end 118 of the set screw 117 can include a hex pocket 126 to facilitate tightening of the set screw 117 by use of a hex key driver (not shown) sized for the hex pocket 126. Alternatively, the set screw 117 can be configured with a nut head or handle to facilitate lightening. The distal end 119 of the set screw 117 can be tapered to firmly secure the mechanical grounding clamp 100 to the grounded member 120.

The mechanical grounding clamp 100 also includes a cap 121 defining a set screw hole 122 (FIG. 5) therethrough and having an inner surface 123 (FIG. 2). The cap 121 is affixable to the outer surface 113 of the upper plate 111. Optionally, the cap 121 is configured to secure a grounding wire 124 (which is not part of the invention per se) between the inner surface 123 of the cap 121 and the outer surface 113 of the upper plate 111. The cap 121 can include curvatures on its inner surface 123 to maintain a secure fit for the grounding wire 124 between the cap 121 and the body 110. More than one grounding wire 124 can be secured to the body 110 via the cap 121. A diameter of the set screw hole 122 is greater than a diameter of the set screw 117 to allow the cap 121 to slip over the proximate end 118 of the set screw 117.

The mechanical grounding clamp 100 also includes a threaded nut 125 mateable with the set screw 117. The nut 125 is configured to secure the cap 121 to the upper plate 111.

The mechanical grounding clamp 100 can also include a washer 127 and lock washer 128 to prevent the nut 125 from loosening.

The cap 121 can be positioned in various orientations with respect to the body 110.

Figure 8:
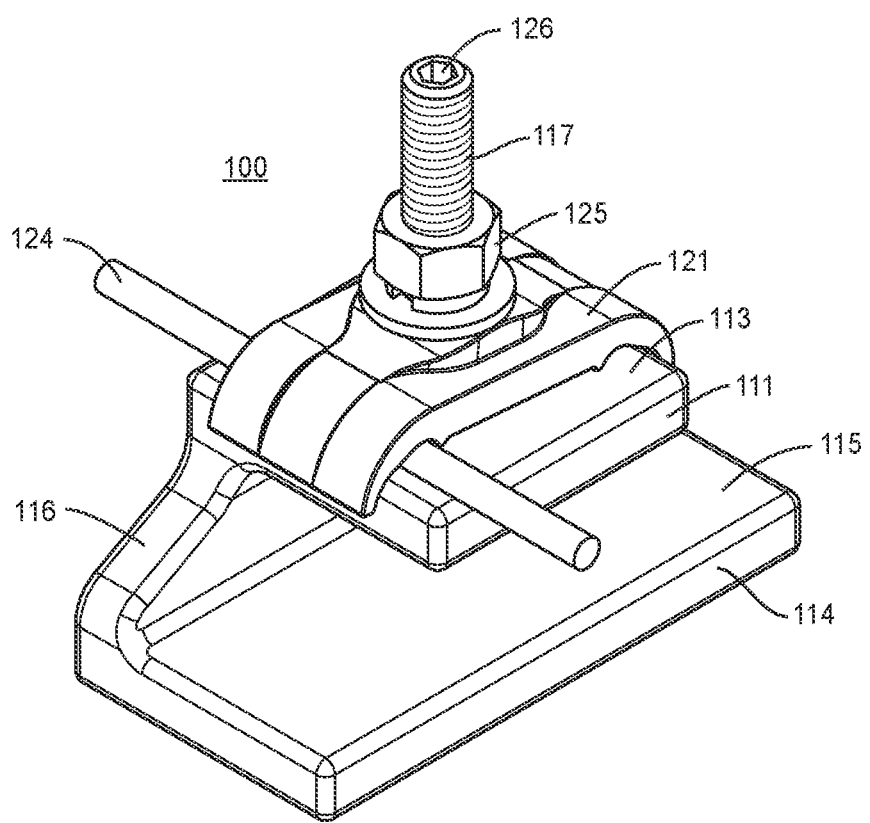
FIG. 8 is a perspective view of the representative mechanical grounding clamp according to a first illustrative embodiment of the present disclosure.
Figure 9:
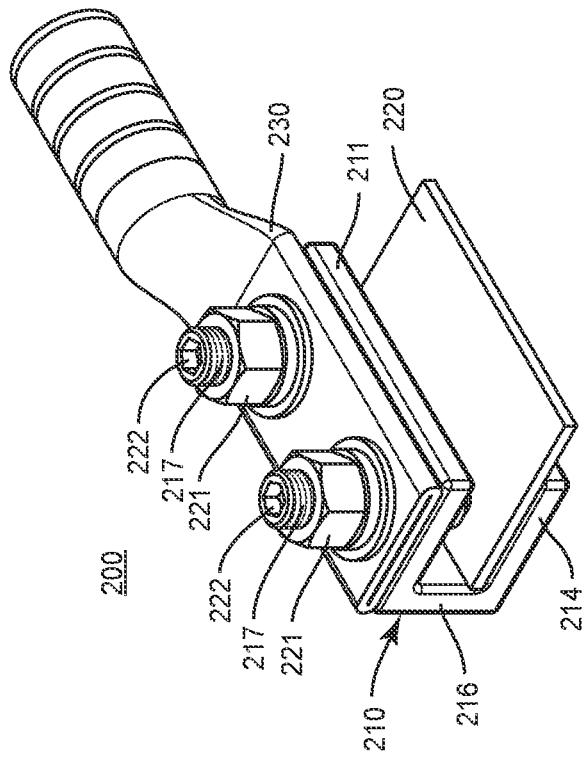
FIG. 9 is a perspective view of the representative mechanical grounding clamp according to a second illustrative embodiment of the present disclosure with a lug and grounded member secured thereto.
Figure 11:
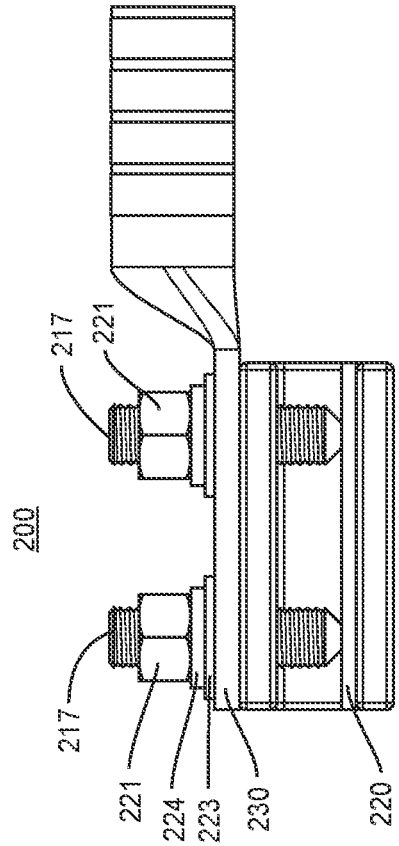
FIG. 11 is a front elevation view of the representative mechanical grounding clamp according to a second illustrative embodiment of the present disclosure.
Figure 10:
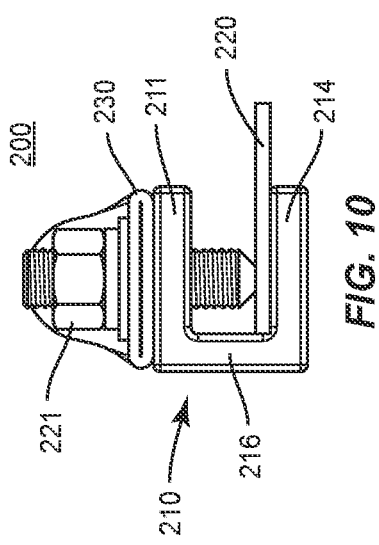
FIG. 10 is a side elevation view of the representative mechanical grounding clamp according to a second illustrative embodiment of the present disclosure.
Figure 12:
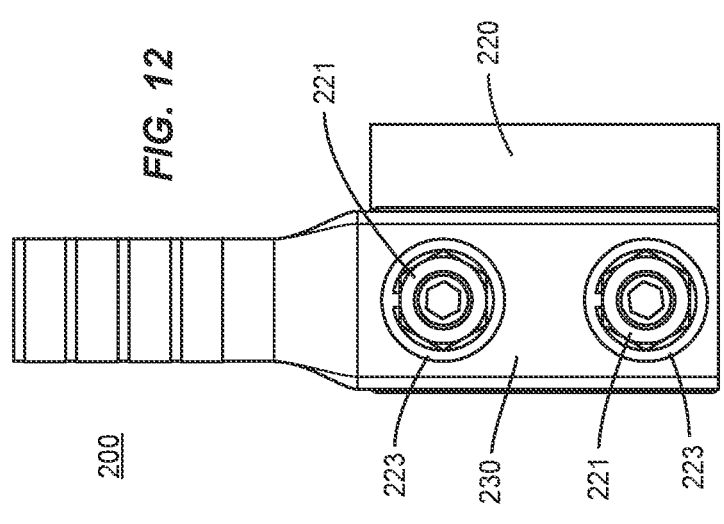
FIG. 12 is a top plan view of the representative mechanical grounding clamp according to a second illustrative embodiment of the present disclosure.
Figure 16:
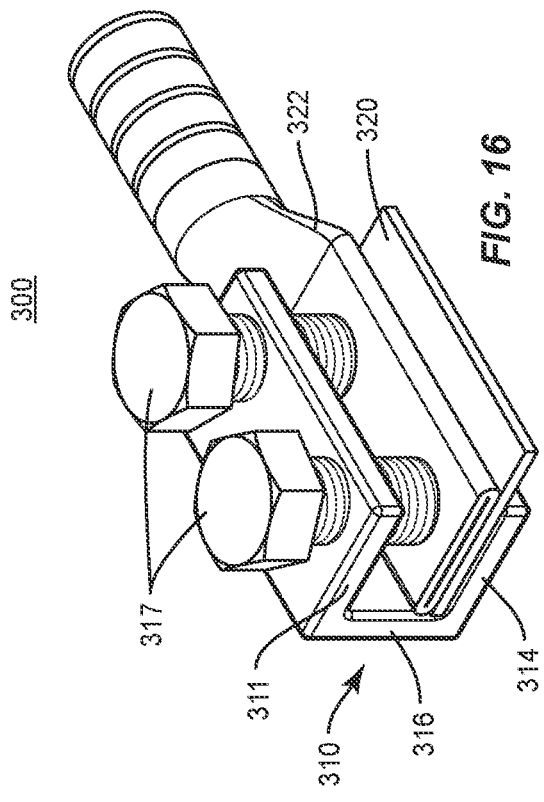
FIG. 16 is a perspective view of the representative mechanical grounding clamp according to a third illustrative embodiment of the present disclosure.
Figure 18:
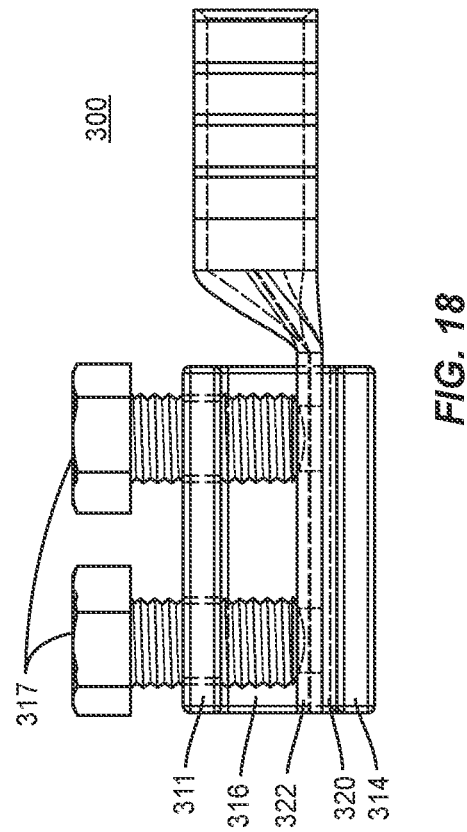
FIG. 18 is a front elevation view of the representative mechanical grounding clamp according to a third illustrative embodiment of the present disclosure.
Figure 19:
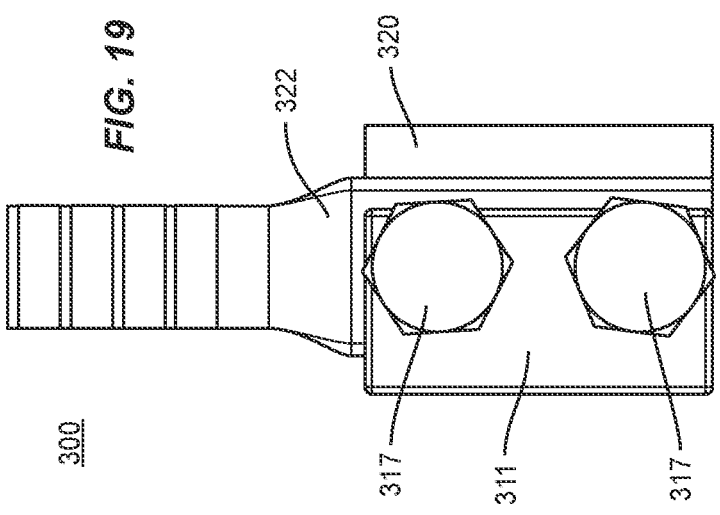
FIG. 19 is a top plan view of the representative mechanical grounding clamp according to a third illustrative embodiment of the present disclosure.
Figure 17:
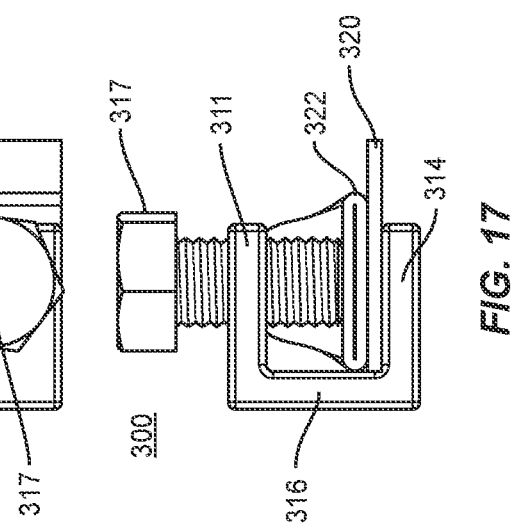
FIG. 17 is a side elevation view of the representative mechanical grounding clamp according to a third illustrative embodiment of the present disclosure.

As shown in FIGS. 1 and 8, the cap 121 optionally engages the sides of the upper plate 111 to inhibit rotation of the cap 121 relative to the body 110, e.g., the cap 121 can include curvatures at ends thereof to prevent rotation of the cap 121 with respect to the body 110 once the cap 121 is secured with the nut 125. Without the curvatures at the ends of the cap 121, the cap 121 can be rotated to any position on the body 110. With the curvatures at ends of the cap 121, the cap 121 is positionable either perpendicular to the body 110 (as seen in FIG. 1) or parallel (FIG. 8).

In use, the set screw 117 of a mechanical grounding clamp 100 as described herein can be used to secure the body 110 of the clamp 100 to a grounded member 120, by threading the set screw 117 into the upper plate 111 of the body 110, positioning the grounded member 120 between the distal end 119 of the set screw 117 and the lower plate 114, and driving the set screw 117 toward the lower plate 114 to secure the body 110 onto the grounded member 120. The proximal end 119 of the set screw 117 is passed through the cap 121, the grounding wire 124 is positioned between the cap 121 and the upper plate 111, and the nut 125 is threaded onto the set screw 117 and driven toward the upper plate 111 to tighten the cap 121 against the grounding wire 124 and the upper plate 111.

Figure 7A:
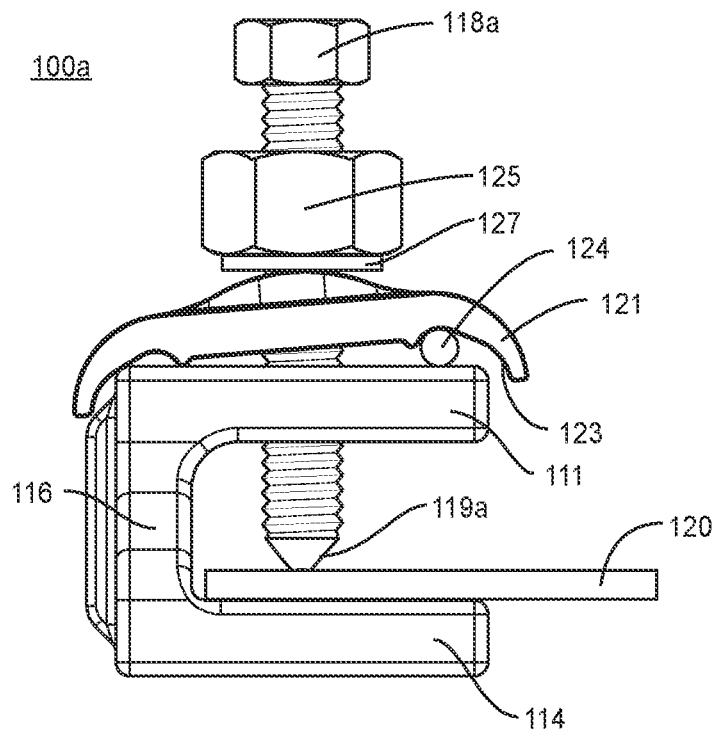
FIG. 7A is a side elevation view of a representative mechanical grounding clamp according to another illustrative embodiment of the present disclosure.
Figure 7B:
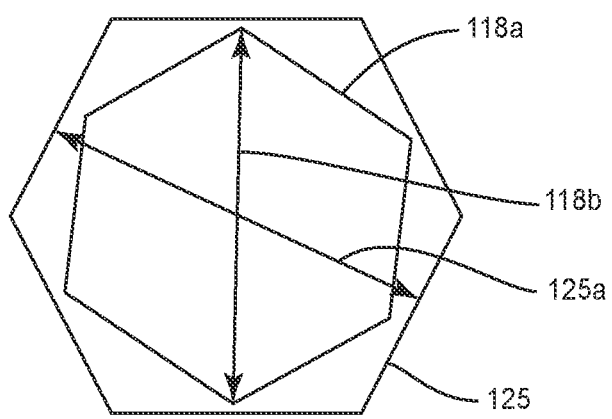
FIG. 7B is a schematic representation of the screw and nut of the clamp of FIG. 7A.

In a variation of the first embodiment, the clamp 100a has the same construction and operation as clamp 100 except that clamp 110a comprises a set screw 117a in place of set screw 117, and the distal end 119a of set screw 117a is configured as a cup point instead of a cone point. In addition, and without regard to the configuration of the distal end 119 or 119a, the set screw 117a has a hex head 118a at the proximal end, which may optionally have a hex pocket 126 thereon (not shown in FIG. 7A) so that the set screw 117a can be tightened using a wrench, socket or hex key. As shown in FIG. 7B, the nut 125 is sized so that the width 125a across the flats of the nut 125 can be engaged by a socket driver into which the hex head 118a is received, and the socket driver can rotate the nut 125 relative to the set screw 117a without interference from the hex head 118a engaging the interior of the socket driver, e.g., the width 125a may exceed the width 118b. In this way, the nut 125 can be tightened or loosened using a socket after the set screw 117a is secured in place. The point-to-point width 118b may be greater than, less than, or equal to, the diameter of the set screw 117a.

Second Embodiment

In a second embodiment, illustrated in FIGS. 9-15, a mechanical grounding clamp 200 includes a body 210 (FIG. 13A), having an upper plate 211 defining at least one threaded hole 212 therethrough and having an outer surface 213, a lower plate 214 spaced apart from the upper plate 211 and having an inner surface 215, and a connecting plate 216 connecting the upper plate 211 to the lower plate 214. The body 210 has a generally C-shaped configuration when viewed from the side (see FIG. 10).

The mechanical grounding clamp 200 also includes at least one set screw 217 mateable with each threaded hole 212 in the upper plate 211 and having a proximate end 218 (FIG. 14) and a distal end 219. The distal end 219 is extendable through the threaded hole 212 of the upper plate 211 and toward the inner surface 215 of the lower plate 214. The distal end 219 of the set screw 217 is configured as a cup point to secure the body 210 to a grounded member 220 positioned between the distal end 219 of the set screw 217 and the inner surface 215 of the lower plate 214. The set screw 217 is configured to receive a lug 230 attached to a grounding wire (not shown). The proximate end 218 of the set screw 217 can include a hex pocket 222 for receiving a hex key driver (not shown) for tightening the set screw 217. The distal end 219 of the set screw 217 can be tapered to secure against grounded member 220.

The lug 230 includes one or more mounting holes 225 (FIG. 13) therein. A diameter of the mounting holes 225 is greater than a diameter of the set screw 217 to allow the lug 230 to fit over and slide down the set screws 217 to mate with the body 210.

The mechanical grounding clamp 200 also includes a threaded nut 221 mateable with the set screw 217 and is configured to secure the lug 230 to the body 210. The mechanical grounding clamp 200 can also include a washer 223 (FIG. 14) and lock washer 224 to prevent the nut 221 from loosening.

In use, a set screw 217 can be used to secure the body 210 of the clamp 200 to a grounded member 220, by threading the set screw 217 into the upper plate 211 of the body 210, positioning the grounded member 220 between the distal end 219 of the set screw 217 and the lower plate 214, and driving the set screw 217 toward the lower plate 214 to secure the body 210 onto the grounded member 220. The proximal end 218 of the set screw 217 is passed through the lug 230 and the threaded nut 221 is threaded onto the set screw 217 and driven toward the upper plate 211 to secure the lug 230 to the upper plate 211.

In the specifically illustrated first embodiment and second embodiment, the same set screw which secures the claim to the grounded member also positions either the cap or the lug on the upper plate and accommodates a nut for securing the grounding wire or lug to the upper plate.

Third Embodiment

In a third embodiment, illustrated in FIGS. 16-22, a mechanical grounding clamp 300 includes a body 310, having an upper plate 311 defining at least one threaded hole 312 therethrough, a lower plate 314 spaced apart from the upper plate 311 and having an inner surface 315 (FIG. 20), and a connecting plate 316 connecting the upper plate 311 to the lower plate 314. The body 310 has a generally C-shaped configuration as viewed from the side (see FIG. 2).

The mechanical grounding clamp 300 also includes at least one threaded bolt 317 mateable with the threaded hole 312 in the upper plate 311. The bolt 317 defines a proximate end 319 (FIG. 21) and a distal end 321. The distal end 321 is extendable through the threaded hole 312 of the upper plate 311 and toward the inner surface 315 of the lower plate 314. The bolt 317 is configured to secure the body 310 to a lug 322 and a grounded member 320 positionable between the distal end 321 of the bolt 317 and the inner surface 315 of the lower plate 314.

Typically, the lug 322 can include one or more mounting holes 323 (FIG. 20) therein. A diameter of the mounting holes 323 is less than a diameter of the bolt 317. The distal end 321 of the bolt 317 can be rounded to firmly center the mounting holes 323 of the lug 322.

In use, a bolt 317 can be used to secure the body of the clamp 300 to a grounded member 320, by threading the bolt 317 into the upper plate 311 of the body 310, positioning the grounded member 320 and the lug 322 between the distal end 321 of the bolt 317 and the lower plate 314, and driving the bolt 317 toward the lower plate 314 to secure the body 310 onto the grounded member 320 and onto the lug 322.

Each of the components that are used to electrically connect a grounding member such as a grounding wire or a lug on a grounding wire to the structural member should be constructed of electrically conductive materials, for example, copper, bronze and/or steel. In addition, although the surfaces of the body contacting the structural member are illustrated as being smooth, a rough or spikes surface can be used to prevent slippage between the body and the structural member.

The present invention can achieve an excellent mechanical connection and electrical connection with the use of only one fastener, thus providing an improvement over the prior art.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A mechanical grounding clamp, comprising:
a body having an upper plate, a lower plate, and a connecting portion connecting the upper plate to the lower plate, the upper plate including a threaded hole therethrough and the lower plate being spaced apart from the upper plate and having an inner surface, wherein the inner surface of the lower plate is a flat continuous surface without holes;
a cap having a fastener hole extending therethrough and an inner surface with at least one curvature, adjacent to an outer edge of the cap, configured to receive a grounding wire, the cap configured to secure the grounding wire between the inner surface of the cap and an outer surface of the upper plate;
a fastener mateable with the threaded hole in the upper plate and the fastener hole in the cap, the fastener having a proximal end and a distal end, the distal end being extendable through the threaded hole of the upper plate and toward the inner surface of the lower plate, the fastener configured to removably secure the body to a grounded member positionable between the distal end of the fastener and the inner surface of the lower plate; and
a threaded nut on the fastener and displaceable along the fastener to secure the cap to the outer surface of the upper plate of the body.

2. The mechanical grounding clamp of claim 1, wherein the inner surface of the lower plate has a surface area greater than a surface area of the outer surface of the upper plate.

3. The mechanical grounding clamp of claim 1, wherein the mechanical grounding clamp has a height defined between an outer surface of the lower plate opposite the inner surface and the outer surface of the upper plate, wherein the height is less than a width of the lower plate and less than a length of the lower plate.

4. The mechanical grounding clamp of claim 1, wherein the distal end of the fastener has a cup point.

5. The mechanical grounding clamp of claim 1, wherein the proximal end of the fastener includes a hex pocket for tightening and removing the fastener.

6. The mechanical grounding clamp of claim 1, further comprising at least one washer between the threaded nut and the cap.

7. The mechanical grounding clamp of claim 1, wherein the fastener is a bolt.

8. The mechanical grounding clamp of claim 1, wherein the cap consists of only one of the fastener hole.

9. A mechanical grounding clamp, comprising:
a body, having an upper plate, a lower plate, and a connecting portion extending between the upper plate to the lower plate, the upper plate including a threaded hole therethrough, and the lower plate being spaced apart from the upper plate and having an inner surface;
a cap having a fastener hole extending therethrough and an inner surface with at least one curvature, adjacent to an outer edge of the cap, configured to receive a grounding wire, the cap configured to secure the grounding wire between the inner surface of the cap and an outer surface of the upper plate;

a first fastener mateable with the threaded hole in the upper plate and the fastener hole in the cap, the fastener having a proximate end and a distal end, the distal end of the fastener being removably extendable through the threaded hole of the upper plate and toward the inner surface of the lower plate; and the fastener configured to removably secure the cap to the body with the grounding wire therebetween and to removably secure the body to a grounded member positioned between the distal end of the fastener and the inner surface of the lower plate.

10. The mechanical grounding clamp of claim 9, wherein the mechanical grounding clamp has a height defined between an outer surface of the lower plate opposite the inner surface and an outer surface of the upper plate, wherein the height is less than a width of the lower plate and less than a length of the lower plate.

11. The mechanical grounding clamp of claim 10, wherein the inner surface of the lower plate has a surface area greater than a surface area of the outer surface of the upper plate.

12. The mechanical grounding clamp of claim 9, further comprising a threaded nut on the fastener and displaceable along the fastener.

13. The mechanical grounding clamp of claim 9, wherein the proximal end of the fastener includes a hex pocket for tightening and removing the fastener.

14. The mechanical grounding clamp of claim 9, wherein the inner surface of the lower plate is a flat continuous surface without holes.

15. The mechanical grounding clamp of claim 9, wherein the cap consists of only one of the fastener hole.

16. A method for grounding a structure, comprising steps of:

attaching a grounding conductor to a structure to be grounded;

providing a grounding clamp comprising a body having an upper plate connected to a lower plate, the upper plate having a threaded hole therethrough and an outer surface, the lower plate being spaced apart from the upper plate and having an inner surface, the inner surface of the lower plate being a flat continuous surface without holes, and a fastener mateable with the threaded hole in the upper plate and having a proximal end and a distal end, the distal end removably extendable through the threaded hole of the upper plate and toward the inner surface of the lower plate;

providing a cap having a fastener hole extending therethrough and an inner surface with at least one curvature, adjacent to an outer edge of the cap, configured to receive a grounding wire, the cap configured to secure the grounding wire between the inner surface of the cap and an outer surface of the upper plate;

engaging a threaded nut onto the fastener;

positioning the grounding conductor adjacent to the outer surface of the upper plate and a grounded member between the upper plate and the lower plate;

driving the fastener through the fastener hole and the threaded hole toward the grounded member to secure the body to the grounded member and the grounding conductor, wherein the grounded member is secured between the distal end of the fastener and the inner surface of the lower plate; and translating the threaded nut along the fastener, toward the distal end of the fastener, to secure the grounding conductor between the cap and the outer surface of the upper plate of the body.

17. The method of claim 16, further comprising a step of positioning at least one washer on the fastener adjacent to the threaded nut before driving the fastener through the threaded hole.

* * * * *